March 25, 1958     D. R. HASSELL     2,828,140
LOG BUNK WITH REMOTELY RELEASABLE STAKE
Filed Sept. 16, 1955
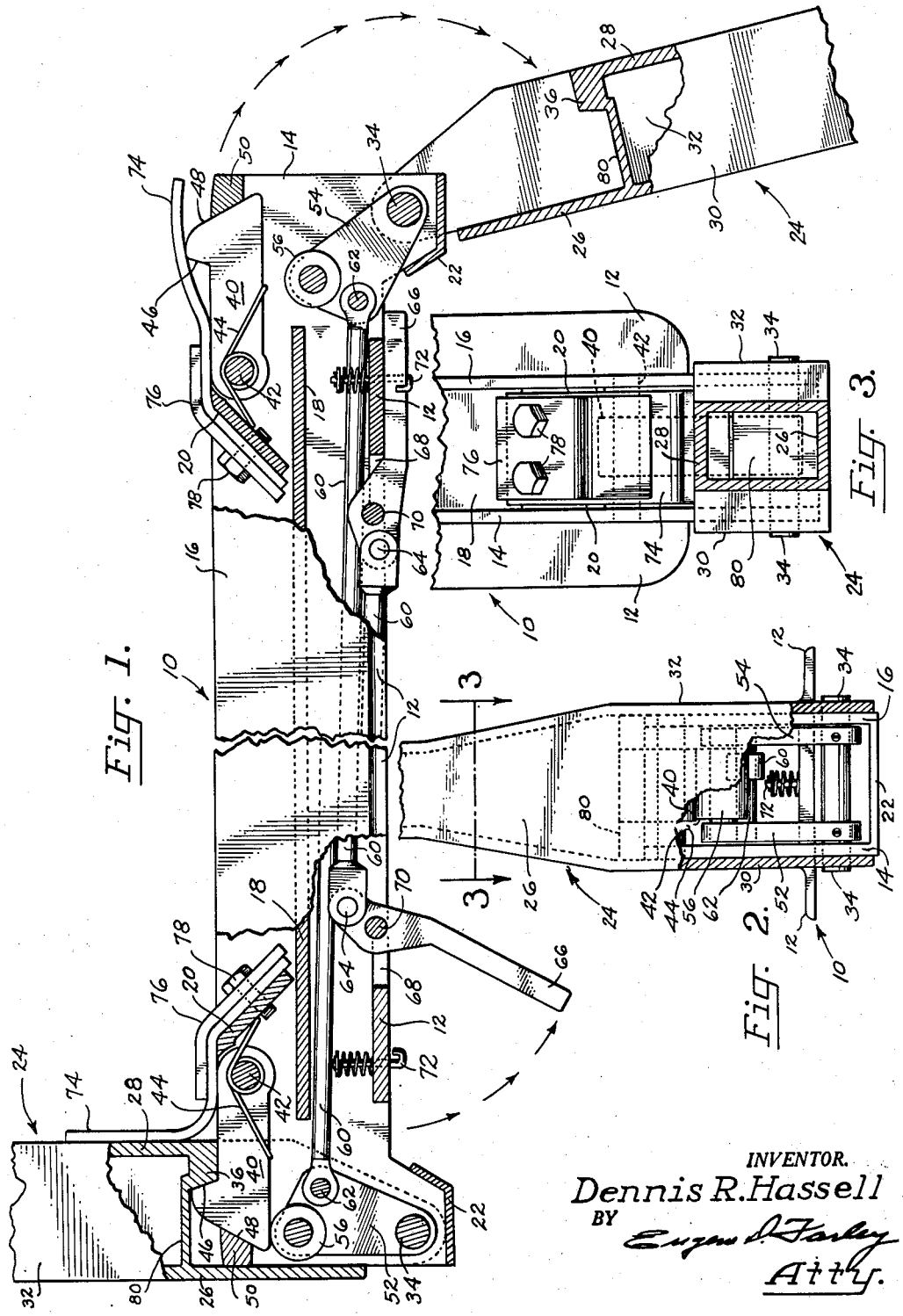
INVENTOR.
Dennis R. Hassell
BY

United States Patent Office 2,828,140
Patented Mar. 25, 1958

2,828,140

LOG BUNK WITH REMOTELY RELEASABLE STAKE

Dennis R. Hassell, Ashland, Oreg., assignor to Hassells, Inc., Ashland, Oreg., a corporation of Oregon Application September 16, 1955, Serial No. 534,714

2 Claims. (Cl. 280—145)

This invention relates to log bunks of the class used for retaining and supporting logs on trucks, railroad cars and other vehicles.

Vehicles employed in transporting logs are provided with two or more bunks extending transversely of the vehicle body at spaced intervals and provided at their ends with stakes for retaining the logs loaded on the vehicle. After the load has been transported to its destination and is ready to be discharged, the stakes are released, permitting the logs to roll off the vehicle. Because of the great weight and cumbersome character of the logs, their transportation and discharge in this manner obviously is dangerous, and many accidents are caused by failure of the bunk or stake mechanism.

Accordingly it is the general object of the present invention to provide a log bunk for logging vehicles which holds the logs securely during transportation and is provided with stakes which may be tripped without hazard to the operator.

Another object of this invention is to provide a log bunk provided with means for locking the stakes which it carries securely in place and for retaining them in place even though breakage of the component parts of the locking assembly should occur.

Another object of this invention is to provide a log bunk which is positive and precise in its action.

Another object of this invention is to provide a log bunk having stakes which will not work loose during use of the bunk.

Another object of this invention is to provide a log bunk having stakes which may be tripped from a remote station by the operator, who accordingly is protected from falling logs.

Another object of this invention is to provide a log bunk having stakes which trip cleanly without the use of following mechanism.

Another object of this invention is to provide a log bunk having stakes which are easy to set back in locked position after tripping, there being no complicated mechanism to adjust.

Another object of this invention is to provide a log bunk the working parts of which are protected from the accumulation of dirt and debris.

Another object of this invention is to provide a log bunk which is of strong construction and may be struck by logs from any side without undue danger of breakage.

Another object of this invention is to provide a log bunk which is light in weight, simple in construction and universally applicable to the various classes of log carrying vehicles.

The manner in which the foregoing and other objects of this invention are accomplished will be apparent from the accompanying specification and claims considered together with the drawings, wherein:

Fig. 1 is a fragmentary view in front elevation, of the herein described log bunk, partly broken away better to show the interior construction;

Fig. 2 is a view in elevation of the stake incorporated in the herein described log bunk assembly, partly broken away to show the interior construction; and Fig. 3 is a sectional view taken along line 3—3 of Fig. 2.

Generally stated, the herein described log bunk comprises a frame adapted for mounting transversely of a vehicle, a stake, a latch positioned for engaging the stake, and means for mounting the latch pivotally to the frame. Provision also is made for locking the latch in position so that the stake can not be tripped inadvertently. Still further, means are provided for tripping the stake from a remote station, and for sealing the working parts of the bunk and stake against the entry of dirt and debris.

In Fig. 1 the log bunk of the present invention is illustrated with the left hand stake upright in its latched, log retaining position, and its right hand stake in its unlatched, log discharging position. The bunk itself comprises a frame 10, the length of which is substantially equal to the width of the vehicle. It is provided with means, not illustrated, for mounting it centrally, pivotally of the vehicle frame. Customarily two such bunks would be provided, one at the front and one at the back of the vehicle.

Frame 10 is generally of channel shape and includes a base plate 12 and a pair of side plates 14, 16. A cover plate 18 may be welded between side plates 14, 16 for shielding the bunk mechanism. Cross pieces 20 are welded across the frame one at each end.

Side plates 14, 16 extend beyond plate 12 at each end of the frame, the extensions being of greater width than the body of the side plates. Plates 22 are welded across the bottom of the side plate extensions. This forms a chamber for reception of the stake mounting and operating mechanism.

Stakes 24 are pivotally mounted one at each end of the bunk frame, and may be generally rectangular in cross section. Thus they comprise a front plate 26, a back plate 28 and a pair of side plates 30, 32.

The stake side plates are of substantial length and overlie the extensions of side plates 14, 16 of the bunk frame. Back plates 28 of the stakes are of restricted length, their lower ends extending, when the stake is in latched position, to approximately the upper edge of bunk frame 10. Front plates 26 of the stakes are longer than the back plates thereof and extend across and seal off the front of the chamber formed in part by the plates of which the bunk frame is composed.

For mounting the stakes pivotally there are provided pins 34 extending through bunk frame side plates 14, 16 at the lower portions of the terminal extensions thereof, as well as through side plates 30, 32 of the stakes. Hence the stakes can be moved angularly between raised positions in which a log load is retained on the vehicle, and lowered positions in which the logs may be discharged from the vehicle.

Latch means are provided for releasably locking the stakes in their raised positions. To this end, latch blocks 36 are welded across the bottom portion of the stakes, and latches 40 positioned for engagement therewith.

The latches comprise shank and head portions and are pivotally mounted on pins 42 extending between side plates 14, 16 of the bunk frame. Suitable springs 44 are provided for urging the latches normally to their advanced, latching position.

The respective heads of the latches are provided with angled latching surfaces 46, dimensioned for engagement with latch blocks 36. Also, the latch heads are formed with angled front surfaces 48. These are dimensioned for frictional engagement with abutment blocks 50 welded between the side plates 14, 16 of the bunk frame 10.

The latch tripping means employed comprises cams including cam plates 52, 54 having cam rollers 56 rotatably mounted therebetween. The bottom ends of the cam plates are mounted on pins 34, which also serve to mount the stakes on the bunk frame.

The elements of the cam assembly are proportioned in such a manner that the cam rollers engage the undersurfaces of latches 40, for supporting the latches in locked position when the stakes are raised, but for permitting release of the latches when the stakes are to be lowered.

Rods 60 are provided for actuating the cams and hence for releasing the stakes. One end of each rod is pivotally connected to a pin 62 extending between cam plates 52, 54. The other end of each rod is connected by means of a pin 64 to a trip lever 66. The trip levers, in turn, are pivotally mounted in slots 68 in base plate 12 of the bunk frame by means of pins 70 extending across the slots.

Suitable retaining means are provided for holding levers 66 when the latches are in locked position. In the illustrated form, such retaining means comprise spring pressed clamps 72 mounted slidably through the base plate and dimensioned for receiving the ends of levers 66. When retainers 72 are removed from levers 66, the levers may be moved downwardly as indicated by the arrows on the left hand side of Fig. 1. This in turn moves, to their retracted positions, the corresponding cams, permitting release and lowering of the stakes.

Means further are provided for sealing off the working parts of the latches to prevent access of bark fragments, dirt and other debris. Accordingly there are provided flaps 74 which are clamped to cross pieces 20 by means of plates 76 and bolts 78. These seal off the openings exposed when the stakes are lowered, as is particularly apparent from a consideration of the right hand stake assembly of Fig. 1.

Plates 80 also are provided to span the openings across the bottoms of the stakes. It will be apparent that when the stakes are in lowered position, their interiors are exposed and may accumulate debris. This debris then would be introduced into the locking mechanism when the stakes are raised. Plates 80 prevent the accumulation of debris in the stakes and hence overcome this difficulty.

The operation of the herein described bunk assembly is readily apparent from the foregoing and from the drawings. When logs are loaded into the vehicle, the stakes are in their upright position, i. e. the left hand position of Fig. 1. Latches 40 are securely seated against latch blocks 36. The cams associated with them are securely situated beneath the latches to prevent their becoming unlatched. Levers 66 connected to the cams are secured in retainers 72 for the same purpose. The forward ends of the latches are securely engaged against abutment blocks 50. Accordingly the latches are locked in from all sides and can not become unlatched even though failure of one or more of the component parts of the assembly should occur.

After the logs have been transported to their destination, one or the other, or both, of levers 66 are released from retainer 72. This action withdraws the cams from beneath the latches whereupon the stakes swing downwardly. During the release of each stake the operator stands at the opposite side of the vehicle, where he is out of danger. Also, as the stakes are released, they break away cleanly and there are no chains, rods, or other following mechanism to impair the efficiency of the stake release action. Furthermore, when the stakes are released and logs discharged over them, the interiors of the bunk and stake assemblies are kept free from debris by the sealing action of flaps 74 and plates 80.

Having thus described my invention in preferred embodiments, I claim as new and desire to protect by Letters Patent:

1. A log bunk comprising a frame adapted for mounting transversely of a vehicle, a stake having a hollow lower end, pivot means securing the stake at said lower end to an end of the frame for movement of the stake between raised and lowered positions, a latch block on the stake within said hollow lower end, an abutment block on the frame within the hollow lower end of the stake when the latter is in raised position, the abutment block being spaced from the latch block, a latch having a shank and a head, pivot means securing said shank to the frame for pivotal movement of the head within the hollow lower end of the stake into releasable abutment with the latch block and abutment block for securing the stake in raised position, resilient means between the frame and latch and normally urging the latch head to said stake-securing position, the head having an oblique surface inclined upwardly in the stake raising direction and arranged to intercept the stake and to be deflected resiliently by the stake during raising of the latter, cam means mounted pivotally on the frame and operatively engaging the latch for releasably securing the latch head in stake-securing position, and cam operating means connected to the cam means and extending toward the end of the bunk opposite said stake for operation from said extended position to move the cam means between latch-securing and latch-releasing positions.

2. A log bunk comprising a frame adapted for mounting transversely of a vehicle, a stake having a hollow lower end, pivot means securing the stake at said lower end to an end of the frame for movement of the stake between raised and lowered positions, a latch block on the stake within said hollow lower end, an abutment block on the frame within the hollow lower end of the stake when the latter is in raised position, the abutment block being spaced from the latch block, a latch having a shank and a head, pivot means securing said shank to the frame for pivotal movement of the head through an opening in the frame into releasable abutment with the latch block and abutment block for securing the stake in raised position, resilient means between the frame and latch and normally urging the latch head to said stake-securing position, the head having an oblique surface inclined upwardly in the stake raising direction and arranged to intercept the stake and to be deflected resiliently by the stake during raising of the latter, cam means mounted pivotally on the frame and operatively engaging the latch for releasably securing the latch head in stake-securing position, link means connected to the cam means and extending toward the end of the bunk opposite said stake, lever means on the extended end of the link means for moving the cam means between latch-securing and latch-releasing positions, and flexible sealing means mounted on the frame and normally abutting the stake when the latter is in raised position and movable upon lowering of the stake to overlie the latch head and seal off the said opening in the frame.

References Cited in the file of this patent
UNITED STATES PATENTS 2,469,760    Berry                    May 10, 1949
2,475,753    Nordberg              July 12, 1949